United States Patent
Kempf et al.

(10) Patent No.: US 8,286,474 B2
(45) Date of Patent: Oct. 16, 2012

(54) ELECTRONIC MODULE FOR MEASURING OPERATING PARAMETERS OF A VEHICLE WHEEL, COMPRISING AN ELECTRONIC UNIT AND AN INFLATION VALVE OF THE "SNAP-IN" TYPE

(75) Inventors: Christian Kempf, Toulouse (FR); François Gory, Tournefeuille (FR); Franz Hillenmayer, Burglengenfeld (DE)

(73) Assignee: Continental Automotive France, Toulouse (FR)

( * ) Notice: Subject to any disclaimer, the term of this patent is extended or adjusted under 35 U.S.C. 154(b) by 399 days.

(21) Appl. No.: 12/667,871

(22) PCT Filed: Jul. 1, 2008

(86) PCT No.: PCT/EP2008/005348
§ 371 (c)(1), (2), (4) Date: Mar. 24, 2010

(87) PCT Pub. No.: WO2009/007035
PCT Pub. Date: Jan. 15, 2009

(65) Prior Publication Data
US 2010/0192682 A1    Aug. 5, 2010

(30) Foreign Application Priority Data
Jul. 6, 2007   (FR) ...................................... 07 04914

(51) Int. Cl.
 *B60C 23/12* (2006.01)
(52) U.S. Cl. ........................ 73/146.8; 73/146; 340/442
(58) Field of Classification Search .................. None
See application file for complete search history.

(56) References Cited

U.S. PATENT DOCUMENTS

| | | | | |
|---|---|---|---|---|
| 4,475,578 A * | 10/1984 | Nidle | ............................ | 152/415 |
| 6,005,480 A * | 12/1999 | Banzhof et al. | ................ | 340/447 |
| 6,163,255 A * | 12/2000 | Banzhof et al. | ................ | 340/447 |
| 6,647,772 B2 * | 11/2003 | Ito et al. | ........................... | 73/146 |

(Continued)

FOREIGN PATENT DOCUMENTS
EP    1 736 328 A1    12/2006

OTHER PUBLICATIONS
International Search Report, dated Oct. 14, 2008, from corresponding PCT application.

*Primary Examiner* — Lisa Caputo
*Assistant Examiner* — Jermaine Jenkins
(74) *Attorney, Agent, or Firm* — Young & Thompson

(57) ABSTRACT

An electronic module for measuring operating parameters of a vehicle wheel, includes an electronic unit (1), an inflation valve (2) of the "snap-in" type made up of a valve body (3) made of an elastomeric material pierced with an axial bore housing a hollow tubular core (15), and elements for securing the electronic unit (1) and the inflation valve (2) together. The elements for securing the electronic unit (1) and the inflation valve (2) to one another include, a ring (20) secured to the electronic unit (1) and designed to be slidably mounted around the portion of the tubular core (15) that extends in the continuation of the valve body (3), in a position of the electronic unit (1) in which the latter extends in the direct continuation of the inflation valve (2), and elements (13, 25, 26) for assembling the ring (20) of the electronic unit on the valve body.

13 Claims, 5 Drawing Sheets

U.S. PATENT DOCUMENTS

Figure 5:
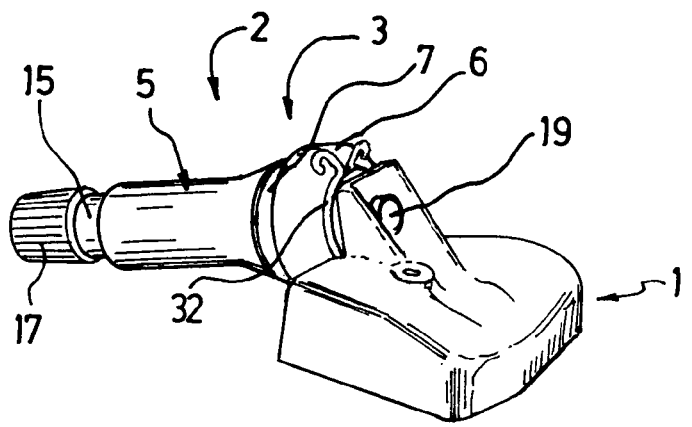

| | | | |
|---|---|---|---|
| 6,722,409 B1 * | 4/2004 | Martin | 152/427 |
| 6,774,775 B2 * | 8/2004 | Ito | 340/442 |
| 6,851,308 B2 * | 2/2005 | Fonteneau | 73/146 |
| 6,895,810 B2 * | 5/2005 | Saheki et al. | 73/146.8 |
| 7,281,421 B2 * | 10/2007 | Yin et al. | 73/146.8 |
| 7,284,418 B2 * | 10/2007 | Yin et al. | 73/146.8 |
| 7,568,286 B2 * | 8/2009 | Platner | 29/897.2 |
| 7,587,935 B2 * | 9/2009 | Kempf et al. | 73/146.8 |
| 7,669,466 B2 * | 3/2010 | Ray et al. | 73/146.8 |
| 2006/0272402 A1 | 12/2006 | Yin et al. | |
| 2006/0272758 A1 | 12/2006 | Yin et al. | |
| 2006/0288924 A1 | 12/2006 | Katou et al. | |
| 2008/0250852 A1 | 10/2008 | Capdepon et al. | |

\* cited by examiner

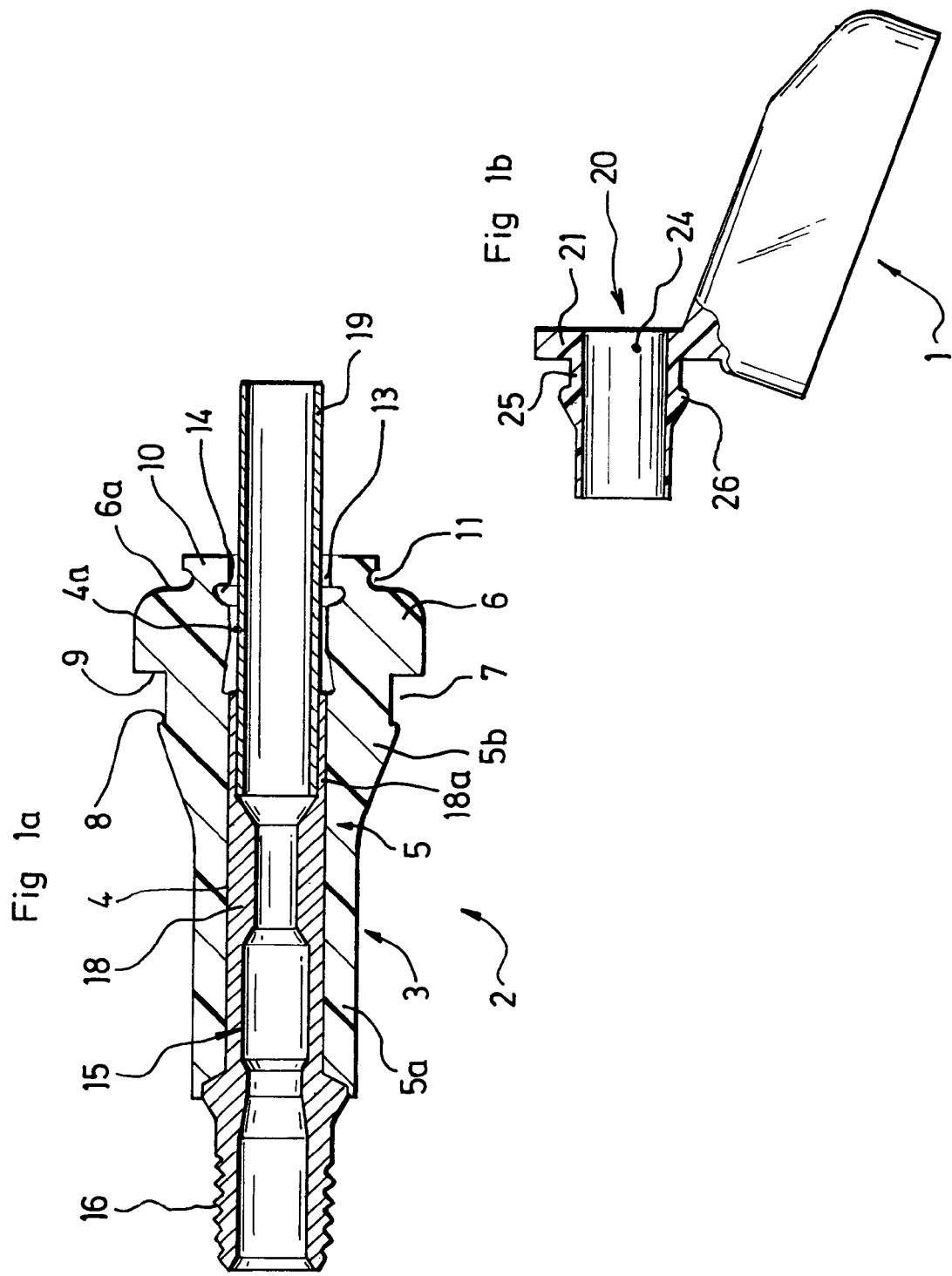

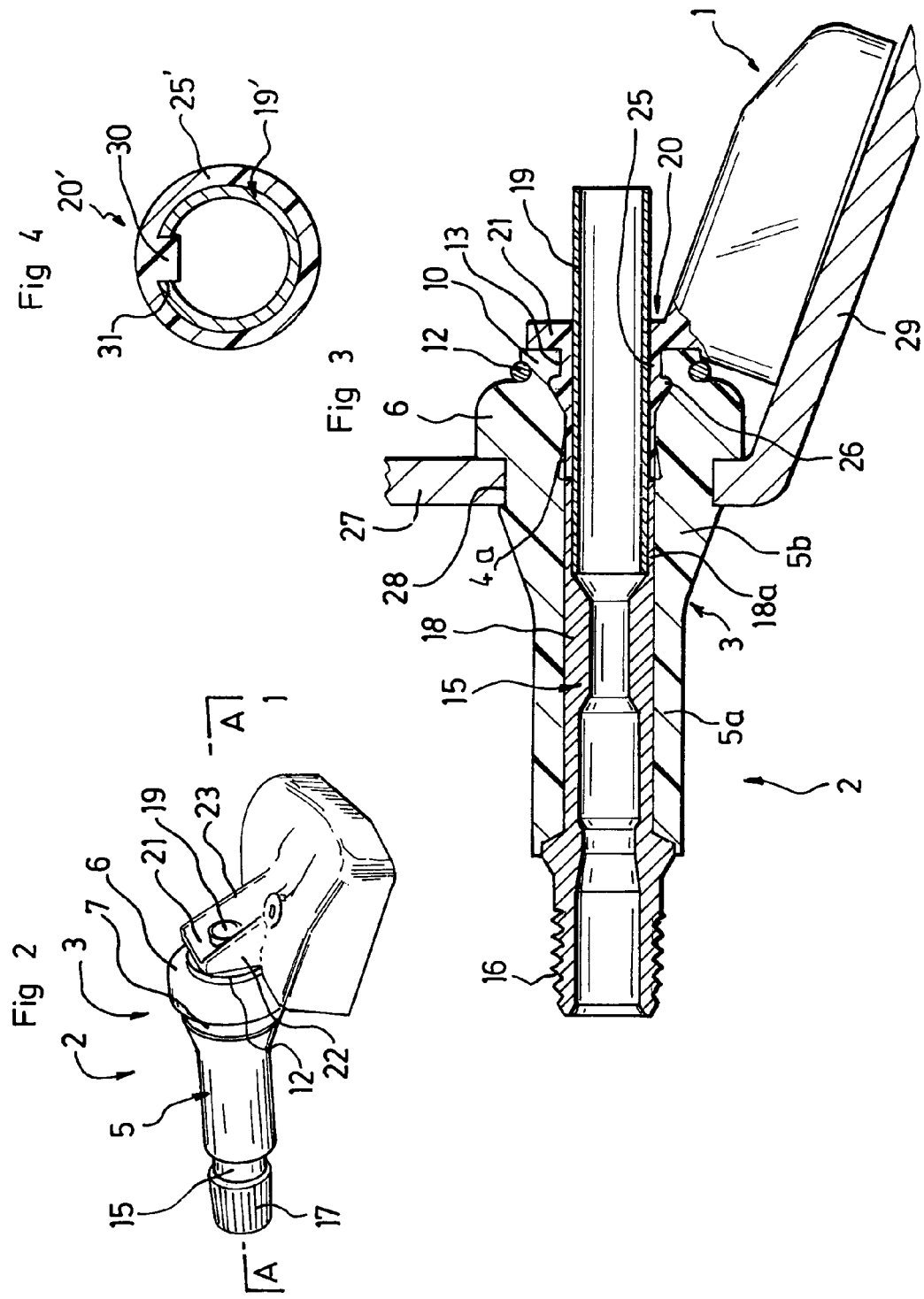

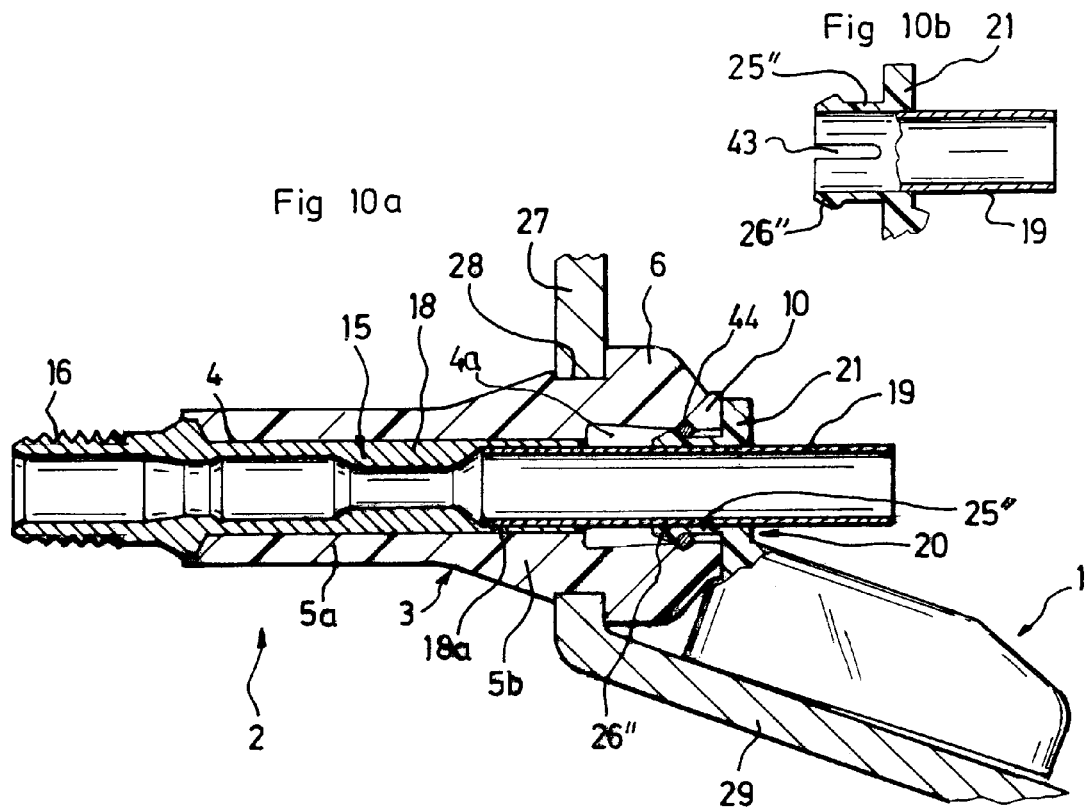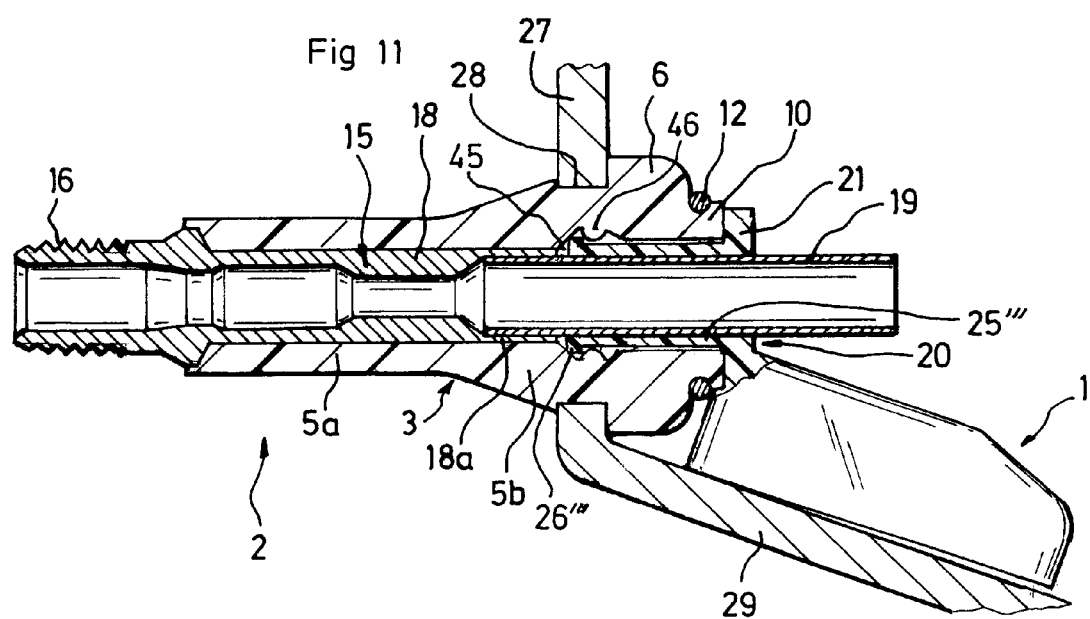

ELECTRONIC MODULE FOR MEASURING OPERATING PARAMETERS OF A VEHICLE WHEEL, COMPRISING AN ELECTRONIC UNIT AND AN INFLATION VALVE OF THE "SNAP-IN" TYPE

The invention relates to an electronic module for measuring operating parameters of a vehicle wheel, comprising an electronic unit and an inflation valve of the "snap-in" type for securing said electronic unit to a wheel rim.

Motor vehicles are increasingly being fitted with systems for monitoring and/or measuring parameters, including sensors.

By way of examples of such systems, mention may be made of the systems that monitor tire pressure which comprise electronic units mounted on each of the wheels of vehicles, and are devoted to measuring parameters, such as the pressure and/or temperature of the tires fitted to these wheels, and which are intended to inform the driver of any abnormal variation in the measured parameter.

One of the present-day solutions which is the one most commonly used for attaching the electronic units to the rims of the wheels is to form electronic modules each made up of an electronic unit and of an inflation valve assembled with said electronic unit. The inflation valve can also be used to secure the electronic unit to the wheel rim.

A first solution regarding such electronic modules is to create special purpose inflation valves able to transmit the loads to which the electronic units are subjected. However, this solution proves expensive because, aside from the high cost of the inflation valves, which are generally made entirely of metal, it entails the production of ancillary components (nuts, seals, etc.) specially designed to ensure that the inflation valve can be mounted airtightly on the rim.

In order to alleviate this disadvantage, a second solution is to produce inflation valves with the same basic design and conventional inflation valves of the "snap-in" type, but modified to react to the forces to which the electronic units are subjected.

This solution in particular has culminated in the production of an electronic unit like the one described in U.S. Pat. No. 6,005,480 which comprises an inflation valve of the "snap-in" type, comprising:
 a valve body made of an elastomeric material, equipped with a longitudinal axial bore and intended to extend through an orifice made in a rim, said valve body being made up of an elastically deformable stem and of an abutment head butting against the rim and separated from the stem by a neck designed to be positioned airtightly in the orifice formed in said rim,
 and a hollow tubular core made of a rigid material, housing a shut-off mechanism and of dimensions suited to be housed in the bore of the valve body and to extending on either side in the continuation of said valve body, said tubular core being made up of two longitudinal portions arranged relative to one another and in relation to the valve body in such a way as to allow an elastic deformation of the stem able to allow the inflation valve to be mounted through the orifice in the rim.

In addition, the electronic module comprises means of securing the electronic unit and the inflation valve together, which means they are designed to allow said electronic unit to be fixed to that portion of the tubular core of the inflation valve that extends in the continuation of the abutment head of the valve body.

According to this principle, the tubular core housed in the valve body is designed to react to the forces to which the electronic unit secured to this core are subjected, and the modifications made to the conventional inflation valves of the "snap-in" type with a view to achieving this result are minimal and therefore inexpensive.

By contrast, it has been found that this solution leads to a substantial limitation on performance of the inflation valve, in terms of airtightness and longevity.

Specifically, the design of the means of securing the electronic unit and the inflation valve together, which has led to the electronic unit being secured to the tubular core of the inflation valve, means that an empty space needs to be created between the abutment head of the valve body and said electronic unit: an empty space such as this is in fact compulsory in order, when the inflation valve equipped with an electronic unit is being mounted, to allow the axial and radial deformations of the stem of the valve body that allow it to be introduced into and passed through the orifice in the rim.

Now, such an empty space leads to an appreciable offsetting of the position of the center of gravity of the inflation valve/electronic unit assembly with respect to the position of the center of gravity of an inflation valve alone, and therefore alters those surface zones of the inflation valve that provide sealing and increases the stresses experienced at the regions of contact between the inflation valve and the rim.

In practice, these modifications and the increases in the stresses to which the inflation valves are subjected lead, as mentioned hereinabove, to a substantial limit on performance of said inflation valves in terms of airtightness and longevity.

The present invention aims to alleviate these disadvantages and its main objective is to provide an electronic module designed so that the stresses to which the inflation valves are subjected are similar to those applied to an inflation valve that does not have an electronic unit.

To this end, the invention is aimed at an electronic module comprising an electronic unit, an inflation valve of the "snap-in" type as described above, and means of securing the electronic unit and the inflation valve together, comprising:
 a ring secured to the electronic unit and designed to be slidably mounted around the portion of the tubular core that extends in the continuation of the abutment head of the valve body, in a position of the electronic unit in which the latter extends in the direct continuation of the inflation valve,
 and means of assembling the ring of the electronic unit on the abutment head of the valve body.

According to the invention, and first of all, the forces applied on the electronic unit are transmitted, via the ring, to the tubular core of the inflation valve which is thus designed to provide said inflation valve with rigidity.

In addition, the electronic unit is:
 assembled directly on the abutment head of the valve body (without any empty space), so that the position of the center of gravity of the inflation valve/electronic unit assembly is optimized regardless of the thickness of the rim,
 mounted such that it can slide relative to the tubular core so as to allow relative movement of these two elements as the inflation valve is being fitted on a rim, without the need for an empty space.

Because of these special features, and in practice, the electronic module according to the invention is able to ensure inflation behavior similar to that of an inflation valve of the traditional "snap-in" type.

According to a first advantageous embodiment of the invention, the tubular core of the inflation valve consists of two longitudinal portions secured in the continuation of one another at the neck of the valve body:

a first longitudinal portion secured to the valve body inside the bore thereof extending into the stem of said valve body and in the continuation of said stem, and a second longitudinal portion free to effect a translational movement inside the bore of the valve body, extending into the abutment head of the valve body and in the continuation of said abutment head.

In addition, the second longitudinal portion of the tubular core advantageously has an outside diameter smaller than that of the first longitudinal portion of said tubular core, so that said longitudinal portions can be secured to one another by pushing one inside the other.

Furthermore, the bore of the valve body advantageously has, inside the abutment head, an internal section of dimensions suited to creating an annular space around the second longitudinal portion of the tubular core, allowing movement (sliding) between the latter and the abutment head.

What is more, the means of assembling the ring of the electronic unit on the abutment head of the valve body advantageously, according to the invention, comprise:

- a hollow sleeve secured to the ring of the electronic unit and designed to enter an annular space created in the abutment head around the tubular core,
- and mating members for blocking relative translational movement of the ring in relation to the valve body, created on the sleeve and formed in the annular space created in the abutment head.

According to this embodiment, the means of assembly may comprise members for blocking translational movement, these members consisting of an annular groove formed in the annular space created in the abutment head, and of an annular rib of a shape that mates with said groove, created on the sleeve of the ring.

These means of assembly may also comprise blocking members consisting of an annular rib projecting into the annular space created in the abutment head, and in a blocking member created on the sleeve of the ring, said sleeve further then having the ability to deform radially, this for example being afforded by longitudinal slips extending from its end, able to allow the blocking member of this sleeve to get past the annular rib positioned in the annular space.

Again based on the same principle, the means of assembly may, according to another advantageous alternative form of embodiment, comprise:

- an annular chamber created on the periphery of the longitudinal bore at the neck of the valve body and designed to delimit, at said neck, a thickness of material designed, by the spinning (upsetting pushing backwards of material), to lead to partial filling of said annular chamber under the effect of the force applied by a rim when said valve body is mounted thereon,
- a sleeve of a length such that the member for blocking the translational movement of said sleeve extends into the annular chamber so as to be blocked in terms of translational movement when the material is spun (or pushed backwards).

Whatever the design of the members for blocking relative rotational movement created on the sleeve, the latter may also advantageously be used to block rotational movement of the electronic unit relative to the valve body. This result may in fact advantageously be obtained, according to the invention, using mating members for blocking relative translational movement of the ring in relation to the valve body, created on the sleeve and on the tubular core.

What is more, to lock the assembly of the ring of the electronic unit on the abutment head of the valve body, this abutment head of the valve body advantageously comprises an external annular housing for positioning a clamping member that clamps said abutment head onto the sleeve of the ring of the electronic unit.

According to another advantageous embodiment also intended to lock the assembly, the abutment head of the valve body and the ring of the electronic unit have complementing reservations able to house a member for keying of said abutment head and ring.

According to another advantageous embodiment of the invention, the electronic unit and the ring are positioned in such a way that said electronic unit is inclined by an angle of the order of 10° to 40° with respect to the longitudinal axis of the valve body. An inclination such as this allows the electronic unit to be kept more or less in contact with the bottoms of the rims (for a broad range of rims existing on the market) thus limiting the stresses experienced.

Other features, objects and advantages of the invention will become apparent from the detailed description which follows, with reference to the attached drawings which, by way of nonlimiting examples thereof, illustrated one preferred embodiment together with eight alternative forms of embodiment relating to the means of assembly and of locking of the ring of the electronic unit and of the abutment head of the valve body.

Figure 6A:
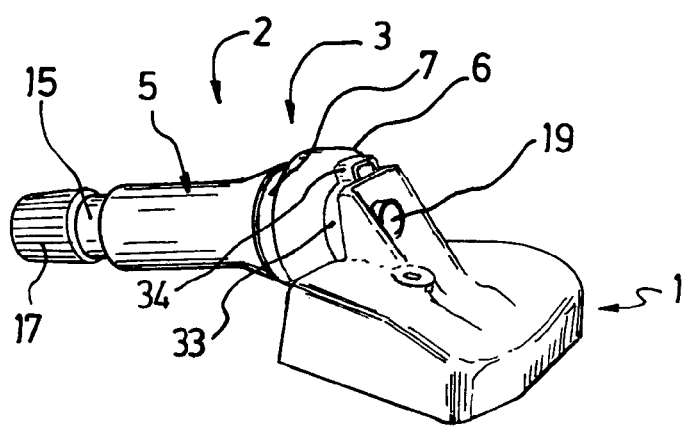
Figure 6B:
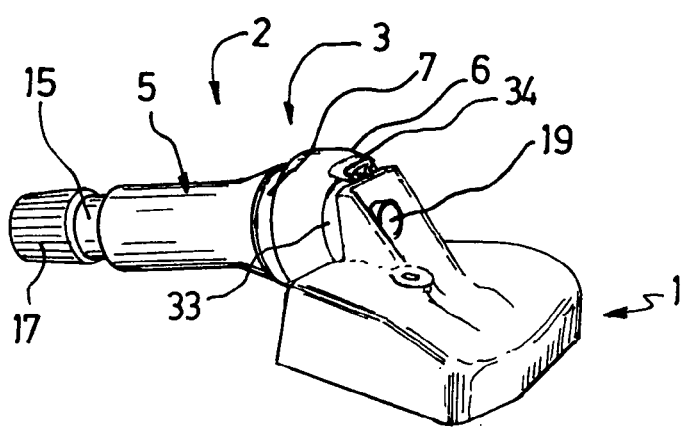
Figure 7:
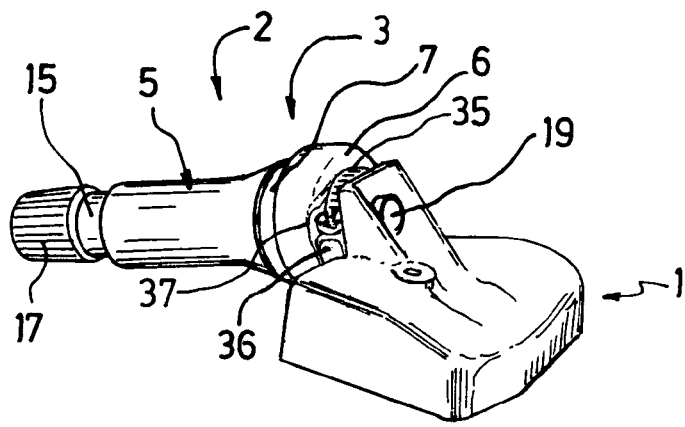
Figures 8A, 8B:
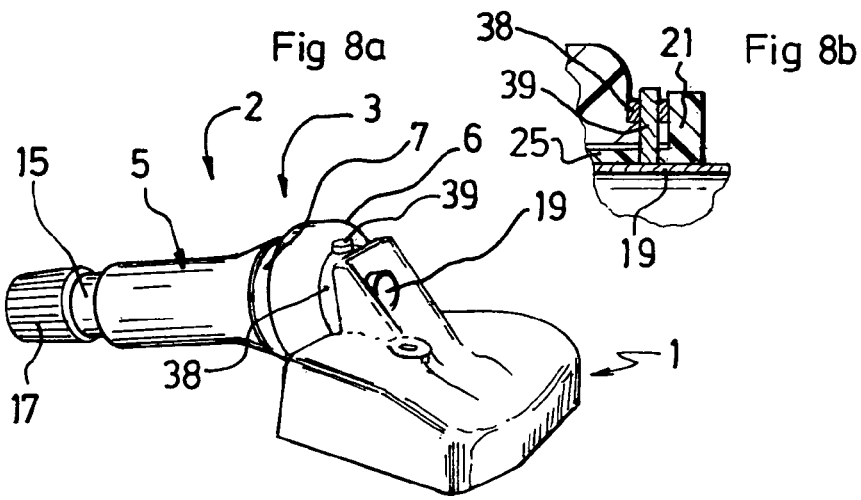
Figures 9A, 9B:
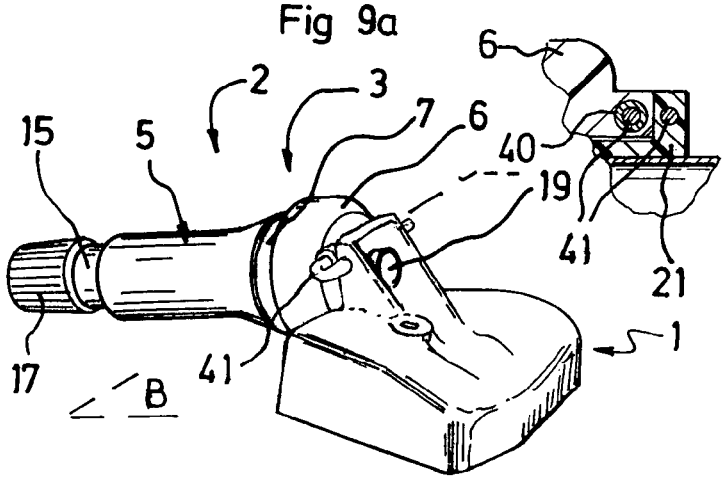

In these drawings:

FIG. 1a is a view in longitudinal section on an axial plane A of FIG. 2, depicting an inflation valve according to the invention, FIG. 1b is a longitudinal view in part section on the longitudinal plane A, of an electronic unit according to the invention, FIG. 2 is a perspective view of an electronic module according to the invention, FIG. 3 is a longitudinal view in part section on the axial plane A depicting this electronic module mounted on a wheel rim, FIG. 4 is a cross section depicting an alternative form of embodiment of the ring of the electronic module according to the invention, FIG. 5 is a perspective view of an electronic module according to the invention, comprising a first alternative form of embodiment of a member for locking the assembly of the inflation valve and of the electronic unit, FIGS. 6a and 6b are two perspective views of an electronic module according to the invention comprising a second alternative form of embodiment of a member for locking the assembly of the inflation valve and of the electronic unit, depicted before (FIG. 6a) and after (FIG. 6b) clamping, FIG. 7 is a perspective view of an electronic module according to the invention, comprising a third alternative form of the embodiment of a member for locking the assembly of the inflation valve and of the electronic unit, FIG. 8a is a perspective view of an electronic module according to the invention comprising a fourth alternative form of the embodiment of members for locking the assembly of the inflation valve and of the electronic unit, FIG. 8b is a partial longitudinal section on the plane A of the electronic module according to FIG. 8a, FIG. 9a is a perspective view of an electronic module according to the invention comprising a fifth alternative form of the embodiment of members for locking the assembly of the inflation valve and of the electronic unit, FIG. 9b is a partial longitudinal section on a longitudinal plane of the electronic module according to FIG. 9a, FIG. 10a is a longitudinal view in part section on the plane A depicting an electronic module provided with a first alternative form of embodiment of means of assembly of the electronic unit and of the valve body, mounted on the wheel rim, FIG. 10b is a longitudinal view in part section on the plane A depicting the ring of the electronic module according to FIG. 10a, and FIG. 11 is a longitudinal view in part section on the plane A depicting an electronic module provided with a second alternative form of embodiment of means of assembly of the electronic unit and of the valve body, mounted on a wheel rim.

The electronic modules according to the invention and depicted by way of examples in the figures are intended to be mounted on vehicle wheels so as to measure operating parameters (pressure, temperature, acceleration, etc.) of said wheels, and to transmit the measured data to central processing units (not depicted) mounted on the vehicles.

Each of these electronic modules is made up of an electronic unit 1 (FIG. 1b) designed to be mounted inside the cover of a pneumatic tire, and of an inflation valve 2 (FIG. 1a) for securing it to the rim of the wheel fitted with this tire.

Firstly, the inflation valve 2 consists of a "snap-in" inflation valve comprising a valve body 3 made of an elastomeric material axially equipped with a cylindrical longitudinal bore 4.

In the conventional way, this valve body 3 is further subdivided longitudinally into a stem 5 and an abutment head 6, separated from the stem 5 by a neck 7.

In addition, the stem 5 is made up of two longitudinal portions of shapes suited to giving said stem properties of longitudinal and radial elastic deformation: a longer, first, end portion 5a, of cylindrical or slightly frustoconical shape, and a second portion 5b of frustoconical shape, with a cone angle greater than that of the first portion 5a.

The abutment head 6 for its part is of cylindrical overall shape and, according to the invention, has a frontal face with respect to which there extends an axial cylindrical endpiece 10 of a diameter smaller than that of said abutment head, on the peripheral wall of which there is formed space 11 (consisting of an annular groove according to the example depicted in FIGS. 1 to 3) able to house an elastic ring 12 (FIG. 3) capable of compressing the cylindrical endpiece 10 onto the ring 20 and of locking the assembly of the inflation valve 2 and of the electronic unit 1.

The neck 7 of this valve body 3 finally has the shape of an annular groove delimited by two shoulders 8, 9 one connecting with the stem 5 and one with the abutment head 6.

The valve body 3 lastly comprises, according to the invention, a cylindrical chamber 13 formed in the cylindrical endpiece 10, at the mouth of the bore 4, inside and in the bottom of which there is formed an internal annular groove 14.

The inflation valve 2 further comprises a hollow tubular core 15 made of a rigid material, of dimensions suited to being housed in the bore 4 of the valve body 3 and extending on either side in the continuation of said valve body. This tubular core 15 is made up of two distinct longitudinal portions 18, 19 secured in the continuation of one another at the neck 7 of the valve body 3.

The first of these longitudinal portions 18 consists of a hollow cylindrical rod 18 of a type known per se, for example made of brass, and notably intended to house the shut-off mechanism (not depicted) of the inflation valve 2. This cylindrical rod 18 is secured to the valve body 3 inside the bore 4 thereof and extends, on the one hand, internally, into the stem 5 as far as the neck 7 and externally in the continuation of said stem. In addition, that portion 16 of this cylindrical rod 18 that is situated in the continuation of the valve body 3 has an external screw thread designed (in the known way) to accept a protective screw cap 17. It should also be noted that, in the customary way, adhesion between the valve body 3 and the external face of the cylindrical rod 18 may be obtained by producing the valve body 3 by overmolding it on said cylindrical rod.

According to the invention, the second longitudinal portion 19 of the tubular core 15 of the inflation valve 2 for its part consists of a cylindrical tube 19 made of a material such as steel which, for the same thickness, is stronger than brass, said cylindrical tube being secured to the end portion 18a of the cylindrical rod 18 situated in the neck 7 and having a length designed to extend, internally, into the abutment head 6 of the valve body 3 and, externally, in the continuation of said abutment head.

This cylindrical tube 19 has an outside diameter smaller than that of the inside diameter of the end portion 18a of the cylindrical rod 18 and designed to allow said tube to be secured to said end portion by pushing the former into the latter. In addition, this diameter is in fact smaller than the diameter of the bore 4, so that an annular space 4a is created around the cylindrical tube 19. As a result, during longitudinal deformations of the stem 5, the cylindrical tube 19, secured to the cylindrical rod 18 and therefore to the stem 5 is free to move axially (to slide) inside the abutment head 6.

The electronic unit of this electronic module is, for its part, made up of a hollow unit 1 intended to house the "electronics" of the electronic module 1, associated with a ring 20 secured to said electronic unit and designed to be mounted such that it can slide along the portion of the cylindrical tube 19 that extends in the continuation of the abutment had 6 of the valve body 3, in a position of the electronic unit 1 in which the latter extends in the direct continuation of the inflation valve 2.

This ring 20 comprises a mounting plate 21, on the one hand, positioned in relation to the electronic unit 1 such that the later is inclined by an angle of the order of 10° to 40° with respect to the longitudinal axis of the valve body 3 and, on the other hand, of which the connection with said electronic unit is strengthened by two lateral gusset plates 22, 23 (FIG. 2).

In addition, this mounting plate 21 is pierced with a circular orifice 24 of a diameter that matches the outside diameter of the cylindrical tube 19, on the peripheral of which there extends a cylindrical sleeve 25 the dimensions of which are suited, on the one hand, to sliding along the cylindrical tube 19 and, on the other hand, to extending into the cylindrical chamber 13 and the annular space 4a substantially as far as the neck 7 of the valve body 3.

This sleeve 25 is also provided with an annular external rib 26 that takes the form of an asymmetric tooth, positioned and designed to become housed in the annular groove 14 of the cylindrical chamber 13.

The electronic unit 1 and the inflation valve 2 of the electronic module according to the invention are first of all assembled by introducing the sleeve 25 into the annular space 4a and the cylindrical chamber 13 and locking of the assembly using the elastic ring 12 in a position in which the electronic unit 1 extends in the direct continuation, without any empty space, of the abutment head 6 of the valve body 3 and is inclined by an angle of the order of 10° to 40° with respect to the longitudinal axis of said valve body 3.

The electronic module thus created can then be introduced into and fitted in an orifice 28 (FIG. 3) made in a rim 27, by the radial and longitudinal deformation properties of the stem 5 of the valve body 3.

It will be noted in particular that the freedom of the regions of the stem 5 to deform during mounting in the rim is made easier by the existence of the annular space 4a. This annular space 4a allows the effort required to insert a conventional "snap-in" valve to be substantially the same as the effort involved in inserting a "snap-in" valve that has been modified according to the invention (that is to say that has been associated with an electronic unit).

During this insertion, the cylindrical tube 19 secured to the rod 18 and detached from the abutment head 6 also in no way impedes the deformation of the stem 5. Furthermore, during this insertion, the ring 20 slides along the portion of the cylindrical tube 19.

By contrast, once the electronic module is mounted on the rim 27, this cylindrical tube 19 acts mainly to stiffen the inflation valve 3. This stiffening is also increased by the presence, inside the abutment head 6, of the sleeve 25 which extends along the cylindrical tube 19.

In addition, once mounting has been performed, the ring 20 remains in direct contact (with no empty space) with the abutment head 6. As a result, the position of the center of gravity of the inflation valve 3 and electronic unit 1 assembly is optimized thanks to the lack of space between these two elements, and the electronic module according to the invention ensures that the inflation valve 3 behaves in a similar way to a traditional inflation valve of the "snap-in" type.

Finally, the inclination of the electronic unit 1 also allows said electronic unit to be kept substantially in contact with the groove 29 formed by the bottom of the rim 27, thus limiting the stresses experienced.

It should also be noted that the electronic module according to the invention and described hereinabove is designed to allow the inflation valve 2 and the electronic unit 1 to be separated, notably once the elastic ring 12 has been removed, so that the electronic unit 1 can be recovered if the inflation valve 2 is changed.

An alternative form of embodiment of the cylindrical tube 19 is illustrated in FIG. 4. In this alternative form of embodiment, the cylindrical tube 19' is produced in the form of an elastic pin. Thus, the cylindrical tube 19' has a longitudinal slot 31. It is introduced into the cylindrical rod 18 not by forcibly pushing it in as illustrated previously, but by closing the tube 19' on itself in order to fit it in the rod 18. This in particular avoids the creation of chips of material as it is inserted into the cylindrical rod 18 which has to remain free of any outcrops because it serves as an air passage. This elastic pin 19' (or any other similar elastic element) is fitted into the rod 18 without introducing stresses and without causing any damage resulting from friction between the rod 18 and the tube (elastic pin) 19'. This enables that the airtightness of this region not to be impaired.

It will be noted that this elastic element (pin 19') is prestressed as it is introduced into the rod 18, ensuring acceptable retention of these two parts one inside the other.

As is then depicted in FIG. 4, the ring 20' may then advantageously be modified and have, at the sleeve 25', an internal key 30 designed to collaborate with the slot 31 of the elastic pin 19'. If this is the case then collaboration between the key 30 and the slot 31 in the pin prevents the pin 19' from rotating in relation to the ring 20' and to the valve body 3.

FIGS. 5, 6a-6b, 7, 8a-8b and 9a-9b depict five alternative forms of embodiments of members for locking the assembly of the inflation valve 2 and of the electronic unit 1 which are further aimed for allowing these two elements to be separated on request.

According to the embodiment depicted in FIG. 5, locking is ensured by means of an open spring ring 32 for example in the overall shape of a "lyre" designed to be fitted into an annular groove 11 as described hereinabove.

According to the embodiment depicted in FIGS. 6a and 6b, locking is ensured by means of a clamping collar 33 (well known by its English names of "ear clamp" or "O clamp") provided with a region or "ear" 34 that can be deformed by squeezing. According to this exemplary embodiment, the clamping collar 33 is positioned in a space 11 of the abutment head 6 defining a planar bearing surface (FIG. 1a) and locking is obtained by squeezing the "ear" 34 which causes the cylindrical endpiece 10 to be compressed onto the sleeve 25 of the ring 20.

According to the embodiment depicted in FIG. 7, locking is ensured by means of a screw 36 collar clamp 35 positioned in a space 11 of the abutment had 6 defining a planar bearing surface. According to this example, a recess 37 able to house the screw 36 is also formed in the abutment head 6, to prevent the collar clamp 35 from turning and thus make screwing and unscrewing operation easier.

FIGS. 8a and 8b for their part depict an embodiment in which locking is ensured by keying of the ring 20 of the electronic unit 1 and of the abutment head 6 of the valve body 3. According to this embodiment, an annular insert 38 is overmolded onto the cylindrical endpiece 10 of the abutment head 6, said insert, the cylindrical endpiece 10 and the sleeve 25 of the ring 20 being pierced with a radial orifice able to house a pin 39 that locks the ring 20 and the abutment head 6 together.

FIGS. 9a and 9b depict a second embodiment whereby locking is ensured by keying. In this embodiment, a spread tubular insert is overmolded onto the cylindrical endpiece 10 of the abutment head 6 and a bore parallel to said insert is created in the mounting plate 21 of the ring 20, so that locking can be performed using a U-shaped clip 41 such that the branches of said clip are housed respectively in the insert 40 and in the bore in the mounting plate 21. In addition, the insert 40 and the bore of the mounting plate 21 are designed to extend in a plane orthogonal to the line of centrifugal force, so as to minimize the pullout force on the clip 41.

FIGS. 10a-10b and 11 for their part depict two alternative forms of the embodiment of the means of assembling the electronic unit 1 and the valve body 3.

According to the embodiment depicted in FIGS. 10a and 10b, a ring 44, secured by overmolding, is positioned in the annular space 4a created in the abutment head 6 and designed to form an annular rim projecting into said annular space.

In addition, the sleeve 25" of the ring 20 has the ability, conferred upon it by longitudinal slots 43 extending from the end of said sleeve, to deform elastically in a radial manner to allow the blocking member 26" formed on said sleeve end and consisting of a symmetric tooth to get past the annular rib 44.

According to the embodiment depicted in FIG. 11, firstly, an annular chamber 45 is created around the periphery of the longitudinal bore 4 at the neck 7 of the valve body 3, said chamber and said neck being designed to delimit a thickness of material designed, by the spinning (upsetting) of material to lead to partial filling 46 of the annular chamber 45 under the effect of the force applied by a rim 27 when the inflation valve 2 is being mounted thereon.

In addition, the sleeve 25''' of the ring 20 has a length designed so that the translation blocking member 26''' created at the end of said sleeve extends into the annular chamber 45 so as to be blocked against any translational movement therein as the material is upset (pushed backwards).

The invention claimed is:
1. An electronic module for measuring operating parameters of the vehicle wheel, comprising:
an electronic unit (1),
an inflation valve (2) of the "snap-in" type for securing the electronic unit (1) to a wheel rim (27), comprising:

a valve body (3) made of an elastomeric material, equipped with a longitudinal axial bore (4) and intended to extend through an orifice (28) made in the rim (27), said valve body being made up of an elastically deformable stem (5) and of an abutment head (6) butting against the rim (27) and separated from the stem (5) by a neck (7) designed to be positioned airtightly in the orifice (28) formed in said rim, and a hollow tubular core (15) made of a rigid material, housing a shut-off mechanism and of dimensions suited to be housed in the bore (4) of the valve body (3) and to extend on either side in the continuation of said valve body, said tubular core being made up of two longitudinal portions (18, 19) arranged relative to one another and in relation to the valve body (3) in such a way as to allow an elastic deformation of the stem (5) able to allow the inflation valve (2) to be mounted through the orifice (28) in the rim (27), and means of securing the electronic unit (1) and the inflation valve (2) to one another, said electronic module being characterized in that the means of securing the electronic unit (1) and the inflation valve (2) to one another comprise:

a ring (20, 20') secured to the electronic unit (1) and designed to be slidably mounted around the portion of the tubular core (15, 19) that extends in the continuation of the abutment head (6) of the valve body (3), in a position of the electronic unit (1) in which the latter extends in the direct continuation of the inflation valve (2), and means (13, 14, 25, 26, 25", 26", 44, 25'", 26'", 45, 46) of assembling the ring (20, 20') of the electronic unit (1) on the abutment head (6) of the valve body (3).

2. The electronic module as claimed in claim 1, characterized in that the tubular core (15) of the inflation valve (2) consists of two longitudinal portions secured in the continuation of one another at the neck (7) of the valve body (3):

a first longitudinal portion (18) secured to the valve body (3) inside the bore (4) thereof extending into the stem (5) of said valve body and in the continuation of said stem, and a second longitudinal portion (19) free to effect a translational movement inside the bore (4) of the valve body (3), extending into the abutment head (6) of the valve body and in the continuation of said abutment head.

3. The electronic module as claimed in claim 2, characterized in that the second longitudinal portion (19) of the tubular core (15) has an outside diameter smaller than that of the first longitudinal portion (18) of said tubular core, so that said longitudinal portions can be secured to one another by pushing one inside the other.

4. The electronic module as claimed in claim 3, characterized in that the bore (4) of the valve body (3) has, inside the abutment head (6), an internal section of dimensions suited to create an annular space (4a) around the second longitudinal portion (19) of the tubular core (15).

5. The electronic module as claimed in claim 2, characterized in that the bore (4) of the valve body (3) has, inside the abutment head (6), an internal section of dimensions suited to create an annular space (4a) around the second longitudinal portion (19) of the tubular core (15).

6. The electronic module as claimed in claim 1, characterized in that the means of assembling the ring (20) of the electronic unit (1) on the abutment head (6) of the valve body (3) comprise:

a hollow sleeve (25, 25', 25', 25'") secured to the rim (20, 20') of the electronic unit (1) and designed to enter an annular space (4a, 13, 45) created in the abutment head (6) around the tubular core (15), and mating members (14, 26, 26", 44, 26'", 46) for blocking relative translational movement of the ring (20, 20') in relation to the valve body (3), created on the sleeve (25, 25', 25", 25'") and formed in the annular space (4a, 13, 45) created in the abutment head (6).

7. The electronic module as claimed in claim 6, characterized in that the means of assembling the ring (20) of the electronic unit (1) on the abutment head (6) of the valve body (3) comprise:

an annular chamber (45) created on the periphery of the longitudinal bore (4) at the neck (7) of the valve body (3) and designed to delimit, at said neck, a thickness of material designed, by the spinning of material, to lead to partial filling (46) of said annular chamber under the effect of the force applied by a rim (27) when said valve body is mounted thereon, a sleeve (25'") of a length such that the member (26'") for blocking the translational movement of said sleeve extends into the annular chamber (45) so as to be blocked in terms of translational movement when the material is spun.

8. The electronic module as claimed in claim 7, characterized in that the abutment head (6) of the valve body (3) comprises an external annular housing (11) for positioning a clamping member (12, 32, 33, 35) that clamps said abutment head onto the hollow sleeve (25, 25'") of the ring (20) of the electronic unit (1).

9. The electronic module as claimed in claim 6, characterized in that the abutment head (6) of the valve body (3) comprises an external annular housing (11) for positioning a clamping member (12, 32, 33, 35) that clamps said abutment head onto the hollow sleeve (25, 25'") of the ring (20) of the electronic unit (1).

10. The electronic module as claimed in claim 1, characterized in that the means of assembling the ring (20') of the electronic unit (1) with the abutment head (6) of the valve body (3) comprise:

a hollow sleeve (25') secured to the ring (20') of the electronic unit (1) and designed to enter an annular space (4a, 13) created in the abutment head (6) around the tubular core (15), and mating members (14, 26) for blocking relative translational movement of the ring (20') in relation to the valve body (3), created on the sleeve (25') and on the tubular core (15).

11. The electronic module as claimed in claim 10, characterized in that the abutment head (6) of the valve body (3) comprises an external annular housing (11) for positioning a clamping member (12, 32, 33, 35) that clamps said abutment head onto the hollow sleeve (25, 25'") of the ring (20) of the electronic unit (1).

12. The electronic module claimed in claim 1, characterized in that the abutment head (6) of the valve body (3) and the ring (20) of the electronic unit (1) have complementing reservations (38, 40) able to house a member (39, 41) for keying said abutment head and ring.

13. The electronic module as claimed in claim 1, characterized in that the electronic unit (1) and the ring (20) are positioned in such a way that said electronic unit is inclined by an angle of the order of 10° to 40° with respect to the longitudinal axis of the valve body (3).

* * * * *